(12) United States Patent
Shimoshikiryoh et al.

(10) Patent No.: US 11,460,742 B2
(45) Date of Patent: Oct. 4, 2022

(54) DISPLAY DEVICE

(71) Applicant: Sharp Kabushiki Kaisha, Sakai (JP)

(72) Inventors: Fumikazu Shimoshikiryoh, Sakai (JP); Takehisa Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/227,425

(22) Filed: Apr. 12, 2021

(65) Prior Publication Data

US 2021/0232009 A1    Jul. 29, 2021

Related U.S. Application Data

(63) Continuation of application No. 16/890,052, filed on Jun. 2, 2020, now Pat. No. 11,003,037, which is a continuation of application No. 16/067,824, filed as application No. PCT/JP2016/088696 on Dec. 12, 2016, now Pat. No. 10,705,395.

(30) Foreign Application Priority Data

Jan. 4, 2016 (JP) .............................. JP2016-000236

(51) Int. Cl.
G09G 3/00 (2006.01)
G02F 1/1362 (2006.01)
G02F 1/1368 (2006.01)
G02F 1/1345 (2006.01)
G09G 3/36 (2006.01)
G09F 9/30 (2006.01)

(52) U.S. Cl.
CPC ...... *G02F 1/136286* (2013.01); *G02F 1/1345* (2013.01); *G02F 1/1368* (2013.01); *G02F 1/13452* (2013.01); *G09F 9/30* (2013.01); *G09G 3/3611* (2013.01); *G09G 3/3648* (2013.01); *G02F 2201/56* (2013.01); *G09G 2300/0408* (2013.01); *G09G 2300/0426* (2013.01)

(58) Field of Classification Search
None
See application file for complete search history.

(56) References Cited

U.S. PATENT DOCUMENTS 10,705,395 B2 * 7/2020 Shimoshikiryoh ... G02F 1/1368
11,003,037 B2 * 5/2021 Shimoshikiryoh .. G09G 3/3648
2016/0225306 A1 * 8/2016 Shin ...................... G02F 1/1333

OTHER PUBLICATIONS

Shimoshikiryoh et al., "Display Device", U.S. Appl. No. 16/890,052, filed Jun. 2, 2020.

* cited by examiner

*Primary Examiner* — Brian M Butcher
(74) *Attorney, Agent, or Firm* — Keating & Bennett, LLP

(57) ABSTRACT

A display apparatus (100) having a displaying region (RD) of a non-rectangular shape includes: a plurality of gate lines (22) being disposed in the displaying region (RD) and extending along a first direction; a plurality of source lines (24) extending along a second direction; a plurality of gate drivers (20G) and a plurality of source drivers (20S) disposed in the frame region (RF); and a gate connection line (26) being provided in the displaying region (RD) so as to extend along a direction which intersects the first direction and connected to one of the gate drivers (20G) and one of the plurality of gate lines (22). A region in which the plurality of gate drivers (20G) are provided and a region in which the plurality of source drivers (20S) are provided are opposite from each other, with the displaying region (RD) being interposed therebetween.

21 Claims, 10 Drawing Sheets

Fig.3
(a) 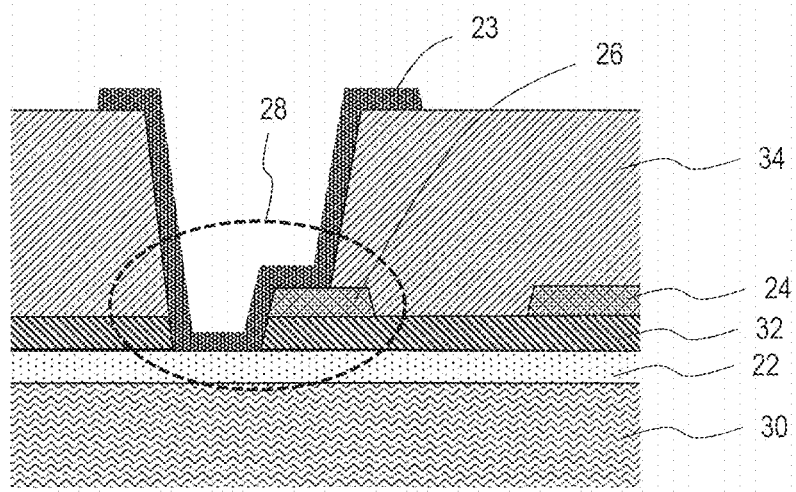
(b) 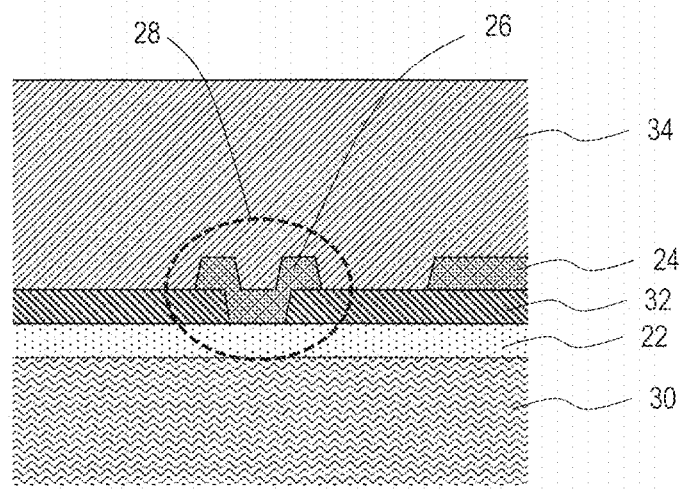

Fig.8
(a)
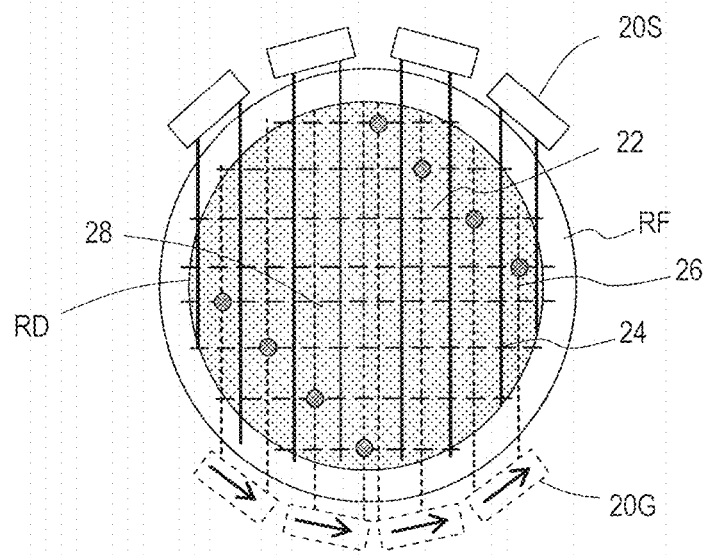
(b)
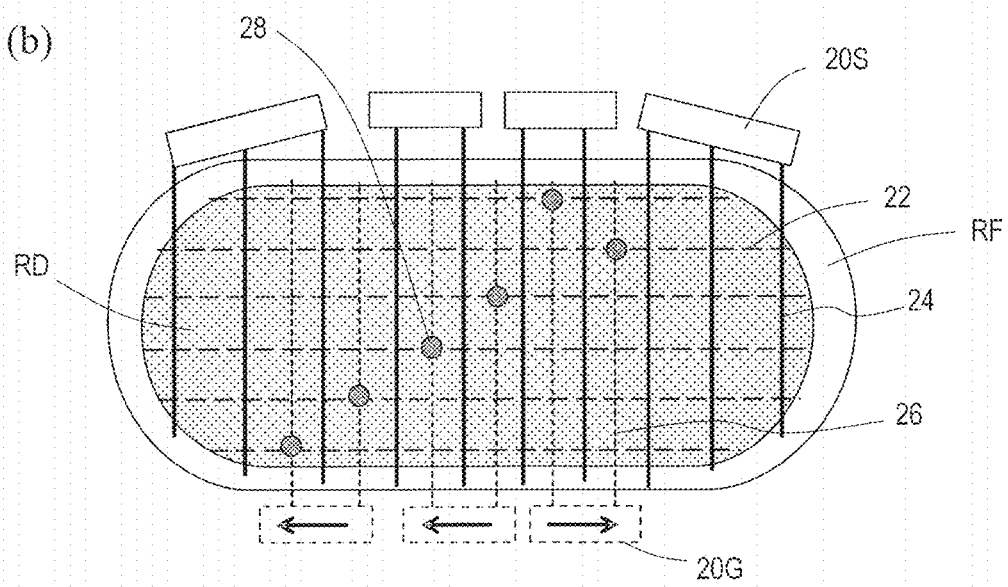

DISPLAY DEVICE

TECHNICAL FIELD

The present invention relates to a display apparatus.

BACKGROUND ART

Liquid crystal display apparatuses are in wide use. A liquid crystal panel that is used in a liquid crystal display apparatus includes a displaying region (active area) having a plurality of pixels arrayed therein and a frame region (non-active area) which lies outside the displaying region. In the displaying region, where images or videos are displayed, a pixel electrode, a TFT (thin film transistor), and the like are provided for each pixel. In the frame region, where images or videos are not displayed, a sealing member for sealing in the liquid crystal material between the substrates, terminal portions of gate lines/source lines, driving circuits, and the like are provided.

The frame region of a liquid crystal panel is a region which does not contribute to displaying, and therefore is preferably narrow. However, while liquid crystal panels are becoming more and more narrow-framed, it is in principle difficult to completely abolish the frame region.

A liquid crystal panel often has a rectangular displaying region. In such a liquid crystal panel, the frame region is to be provided outside and along the four sides of the rectangular displaying region. In recent years, the applicants of the present application have been marketing smartphones of three-side narrow frame type, in which the frame region is narrowed on three sides.

On the other hand, display panels of special shapes, i.e., having planar shapes other than rectangles, are known. Patent Document 1 discloses a display apparatus having a circular displaying region. It is expected that display apparatuses having a circular displaying region are going to be mounted e.g. in wearable devices such as smartwatches, as well as various other mobile terminals, in the future.

Display apparatus of various special shapes, including not only circles but ellipses and polygons, or any recessed shapes, etc., are also expected to be in demand. Display apparatuses of special shapes, called free-form displays, have been actively developed by the applicants of the present application. Such display apparatuses having special shapes can be suitably used not only in small-sized display apparatuses for portable use as aforementioned, but also in instrument panels for onboard use in vehicles, digital signage, etc., for example.

CITATION LIST

Patent Literature

[Patent Document 1] Japanese Patent No. 5191286

SUMMARY OF INVENTION

Technical Problem

In the frame region of a liquid crystal panel, gate driving circuits (gate drivers) and source driving circuits (source drivers) are provided. The gate drivers and the source drivers may be, for example, drivers which are monolithically formed on a substrate, or drivers which are COG (Chip on Glass)-mounted as IC chips on a substrate. Alternatively, instead of being directly provided on a substrate, the drivers may be TAB (Tape Automated Bonding)-mounted or COF (Chip on Film)-mounted.

Within the displaying region of a liquid crystal display apparatus, a plurality of gate lines extending along the horizontal direction and a plurality of source lines extending along the vertical direction are arranged in a lattice shape. In a generic liquid crystal display apparatus having a rectangular displaying region, the gate drivers to be connected to the gate lines are provided in the frame region along the right edge or the left edge of the panel. On the other hand, the source drivers to be connected to the source lines are provided in the frame region along the upper edge or the lower edge of the panel. Gate drivers may be provided along both of the right edge and the left edge of the panel, whereas source drivers may be provided along both of the upper edge and the lower edge of the panel. These constructions facilitate routing of wiring lines in the frame region, thus making it easy to narrow the frame region.

On the other hand, in a display apparatus having a displaying region of a non-rectangular shape, care may be needed for the arrangement of the drivers in the frame region (or the mounting regions for the drivers). In particular, when the frame region is to be narrowed, in order to dispose the drivers in a narrow region outside the displaying region, routing or the like of the wiring lines, etc., cannot help becoming complex in some cases.

In the display apparatus described in Patent Document 1, a source driver is disposed along the lower edge of the displaying region, and gate drivers are disposed along the right and left edges of the displaying region, so as to conform to a circular displaying region. In this construction, source lines for the pixels located at the right and left ends are routed through the frame region so as to be connected to the source driver. In the display apparatus with this construction described in Patent Document 1, narrowness of the frame region needs to be somewhat compromised.

As described above, a display apparatus having a displaying region of a non-rectangular shape has a problem in that arrangement of drivers and routed wiring lines, etc., to be provided in the frame region are likely to become more complex than in rectangular display apparatuses.

The present invention has been made in view of the above problem, and an objective thereof is to realize a narrow frame construction in a display apparatus having a non-rectangular displaying region.

Solution to Problem

A display apparatus according to an embodiment of the present invention is a display apparatus having a displaying region including a plurality of pixels and a frame region provided outside the displaying region, the displaying region having a non-rectangular shape, the display apparatus comprising: a plurality of gate lines being disposed in the displaying region and extending along a first direction; a plurality of source lines being disposed in the displaying region and extending along a second direction which intersects the first direction; a plurality of gate drivers disposed in the frame region, the plurality of gate lines each being connected to one of the plurality of gate drivers; a plurality of source drivers disposed in the frame region, the plurality of source lines each being connected to one of the plurality of source drivers; and a gate connection line provided in the displaying region so as to extend along a direction which intersects the first direction, the gate connection line being connected to each of the plurality of gate drivers and one of the plurality of gate lines, wherein, a region in which the plurality of gate drivers are provided and a region in which the plurality of source drivers are proved are opposite from each other, with the displaying region being interposed therebetween.

In one embodiment, at least one gate connection line is associated with each of the plurality of gate lines. Some or all of the plurality of gate lines (redundant structure) may have two or more gate connection lines associated therewith. In one embodiment, one gate line or two or more gate lines among the plurality of gate lines that are at positions near the gate drivers may be connected to the gate drivers directly not via gate connection lines, or indirectly via connection lines. In the meantime, the connection lines may be disposed outside the displaying region.

In one embodiment, the gate connection line includes a portion extending along the second direction.

In one embodiment, the gate connection line includes a portion extending between two adjacent source lines.

In one embodiment, the gate connection line is provided in a same layer as the plurality of source lines.

One embodiment further comprises a gate insulating layer covering the plurality of gate lines, wherein the gate connection line and one of the plurality of gate lines are connected in an opening which is made in the gate insulating layer.

In one embodiment, the gate connection line and the one of the plurality of gate lines are connected via an electrically conductive layer that is disposed in the opening.

In one embodiment, the gate connection line includes a straight portion which is provided in a same layer as the plurality of gate lines.

In one embodiment, the displaying region has a planar shape which is a circle or an ellipse.

Advantageous Effects of Invention

According to an embodiment of the present invention, a narrow frame region can be realized in a display apparatus having a displaying region of a non-rectangular shape.

BRIEF DESCRIPTION OF DRAWINGS

FIG. 3 A diagram showing a cross section taken along line A-A' in FIG. 2, where (a) and (b) show respectively different implementations.

FIGS. 8 (a) and (b) are plan views showing circuit constructions of display panels according to other embodiments of the present invention.

DESCRIPTION OF EMBODIMENTS

Hereinafter, with reference to the drawings, embodiments of the present invention will be described. However, the present invention is not limited to the following embodiments.

Embodiment 1

Figure 1:
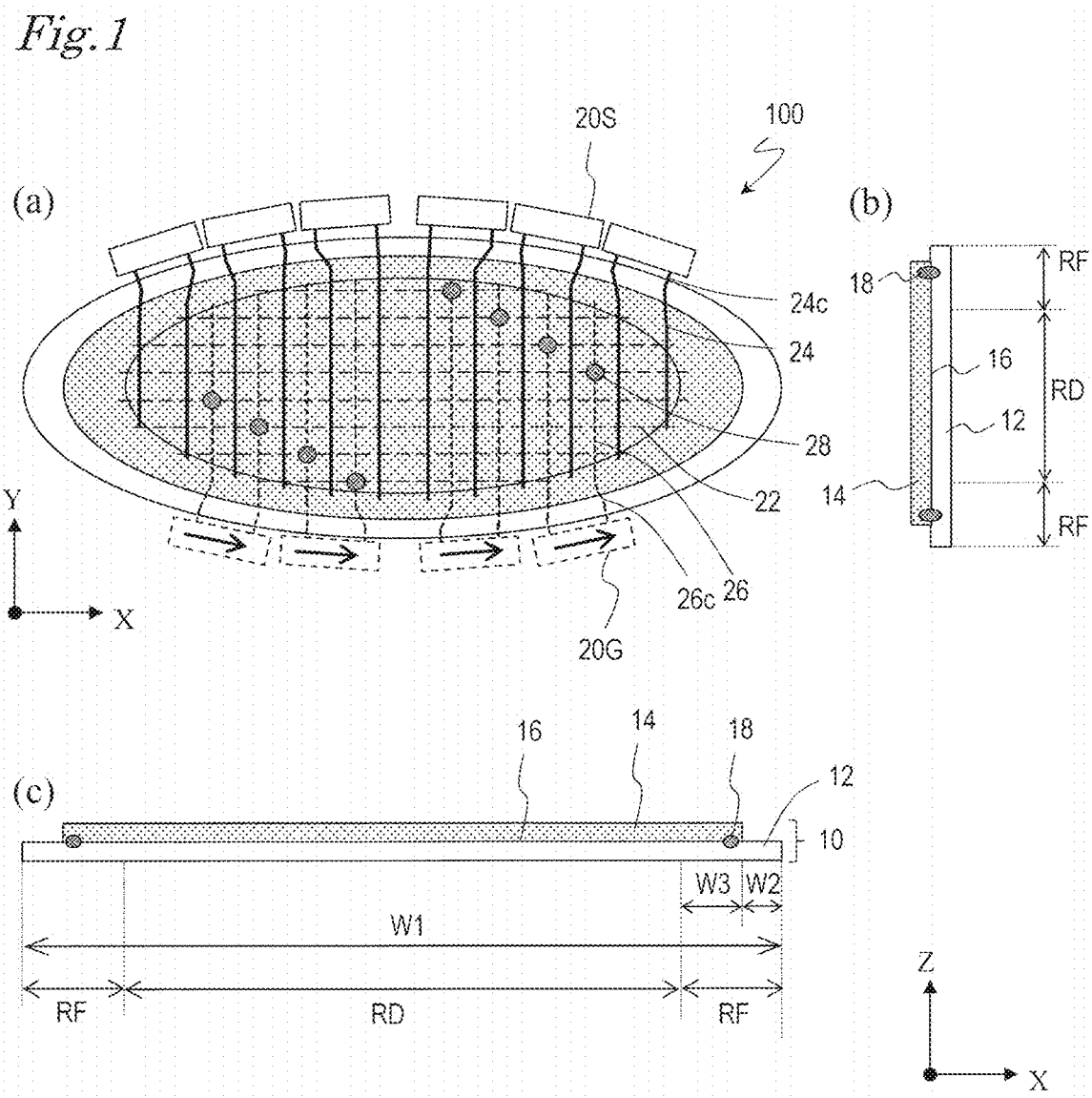
FIG. 1 A schematic diagram showing a circuit construction for a display panel according to Embodiment 1 of the present invention, where (a) is a front view, and (b) and (c) are side views.

FIG. 1, including (a) through (c), shows a display apparatus 100 according to Embodiment 1. The display apparatus 100 is a liquid crystal display apparatus having a display panel (liquid crystal panel) 10 which includes a liquid crystal layer as a display medium layer. As shown in FIG. 1(a), the display panel 10 of the present embodiment includes a displaying region RD having a non-rectangular shape, or more specifically, an ellipse. Outside the displaying region RD, a frame region RF is provided along the outer periphery of the ellipse.

In the displaying region RD, a plurality of pixels are provided in a matrix shape. In the displaying region RD, the plurality of pixels constitute rows and columns along the major axis direction and along the minor axis direction of the ellipse. Since the displaying region RD is elliptical, the central pixel row (i.e., the row of pixels that is on the major axis) has the largest number of pixels, whereas the pixel rows at the ends have the smallest number of pixels. Similarly, the central pixel column (i.e., the column of pixels that is on the minor axis) has the largest number of pixels, whereas the pixel columns at the ends have the smallest number of pixels.

Thus, in a display apparatus having a displaying region of a special shape, unlike in a display apparatus having a rectangular displaying region, neither the number of pixels included in each pixel row nor the number of pixels included in each pixel column is constant. In the case of an elliptical displaying region as in the present embodiment, the ratio of the smallest number of pixels to the largest number of pixels among the pixel rows may be e.g. about 30 to 80%.

In the frame region RF, a sealing member 18 and gate drivers 20G and source drivers 20S for driving the pixels are provided.

The gate drivers 20G and the source drivers 20S may be e.g. drivers which are monolithically formed on a substrate, drivers which are COG-mounted as IC chips on a substrate, or drivers which are TAB-mounted or COF-mounted. In the frame region RF, wiring lines, terminals, etc. to be connected to an FPC (flexible printed wiring board) or the like.

In the following description, the major axis direction of an elliptical displaying region RD may be referred to as the X direction or the horizontal direction, and its minor axis direction as the Y direction or the vertical direction. As a mere convenience based on the drawings, the major axis direction of an ellipse may be referred to as the right-left direction and its minor axis direction as the up-down direction; in actual use, however, these may not correspond to the up/down/right/left directions.

As shown in FIGS. 1(b) and (c), the display panel 10 has a construction in which a liquid crystal layer 16 is provided between a TFT substrate 12 and a counter substrate 14. The TFT substrate 12 and the counter substrate 14 are kept attached to each other by the sealing member 18 of an elliptical ring shape which is provided along the outer periphery of the TFT substrate 12 (or the counter substrate 14). The liquid crystal layer 16 is retained between the TFT substrate 12 and the counter substrate 14, while being surrounded by the sealing member 18.

The display mode of the display apparatus 100 may be various. For example, in a vertical alignment (VA) mode for effecting full-color display, a TFT and a pixel electrode connected thereto are provided for each pixel on the TFT substrate 12. On the counter substrate 14, a common electrode, a color filter layer, a black matrix, and the like are provided. In lateral electric field modes such as the FFS (Fringe Field Switching) mode, pixel electrodes having a plurality of slits and elongated electrode portions, a common electrode for generating lateral electric fields between itself and the pixel electrodes, and the like are provided on the TFT substrate 12.

The frame region RF of the display apparatus 100 is defined as a region outside the displaying region RD. The frame region RF includes the sealing member 18 and a protruding region of the TFT substrate 12 on its outside. Moreover, the frame region RF of the display apparatus 100 may include a lateral housing (not shown) which is disposed outside the TFT substrate 12. The frame region RF may be any region in the outer vicinity of the displaying region RD, without being limited to a region over the TFT substrate 12.

The aforementioned protruding region of the TFT substrate 12 means an outer peripheral portion of the TFT substrate 12 that protrudes outside of an overlap between the TFT substrate 12 and the counter substrate 14. The protruding region of the TFT substrate 12 is a region created by the fact that the TFT substrate 12 is somewhat larger than the counter substrate 14. In the protruding region of the TFT substrate 12, connection terminals for gate lines, connection terminals for source lines, routed wiring lines, gate drivers, source drivers, and the like may be provided. The protruding width W2 of the TFT substrate 12 may be e.g. 10 mm or less. The maximum width (major axis) of the TFT substrate 12 along its ellipse major axis direction may be e.g. about 40 cm.

When the gate drivers and the source drivers are e.g. COG-mounted as driver ICs, as shown in FIG. 1(*a*), the gate drivers 20G and the source drivers 20S are disposed on the protruding region (width W2) within the frame region RF, or outside thereof. When the gate drivers and the source drivers are formed as monolithic drivers on the TFT substrate 12, the monolithic drivers are to be disposed in a region (width W3) within the frame region RF that is surrounded by the sealing member 18. In other words, the monolithic drivers are to be disposed between the displaying region RD and the sealing member 18, so that, together with the liquid crystal layer 16, they are protected from the atmospheric air by the TFT substrate 12, the counter substrate 14, and the sealing member 18 which keeps them attached to each other. The sealing member 18 may overlap the monolithic drivers. It will be appreciated that either the gate drivers or the source drivers may be the only monolithic drivers.

In the case of using COF-mounted or TAB-mounted drivers, it suffices that the connection terminals (driver mounting regions) are provided in the protruding region of the TFT substrate 12, while the IC chips themselves may not necessarily exist on the TFT substrate 12. In the present embodiment, regardless of how the drivers are implemented, the drivers may be provided in various manners in the frame region RF outside the displaying region RD (without being limited to the protruding region of the TFT substrate 12), and the protruding region of the TFT substrate 12 may have the drivers themselves, or the mounting regions for the drivers, provided therein. In the present specification, the region in which the gate drivers are provided or the region in which the source drivers may refer to not only a region on the TFT substrate 12 where monolithic drivers (or IC chips) are disposed, but also a TAB- or COF-driver mounting region.

As aforementioned, the gate drivers 20G may be drivers which are monolithically formed on the TFT substrate 12, for example. Monolithic gate drivers can be fabricated by utilizing the process of fabricating the circuitry (TFTs, pixel electrode, etc.) composing the pixels. The source drivers 20S, which may also be monolithically formed, may be provided in other manners, e.g. COG-mounted, because they are likely to be more complex in construction than the gate drivers.

As shown in FIG. 1(*a*), in the present embodiment, the region in which the gate drivers 20G are provided and the region in which the source drivers 20S are provided are disposed opposite from each other, with the displaying region RD being interposed therebetween. More specifically, the plurality of source drivers 20S (or the source driver mounting region) are disposed in a peripheral portion above the displaying region RD, whereas the plurality of gate drivers 20G (or the gate driver mounting region) are disposed in a peripheral portion below the displaying region RD so as to be opposite from the source drivers 20S. The manner of connection between the gate drivers 20G and gate lines 22 and the manner of connection between the source drivers 20S and source lines 24 will be described later.

Figure 10:
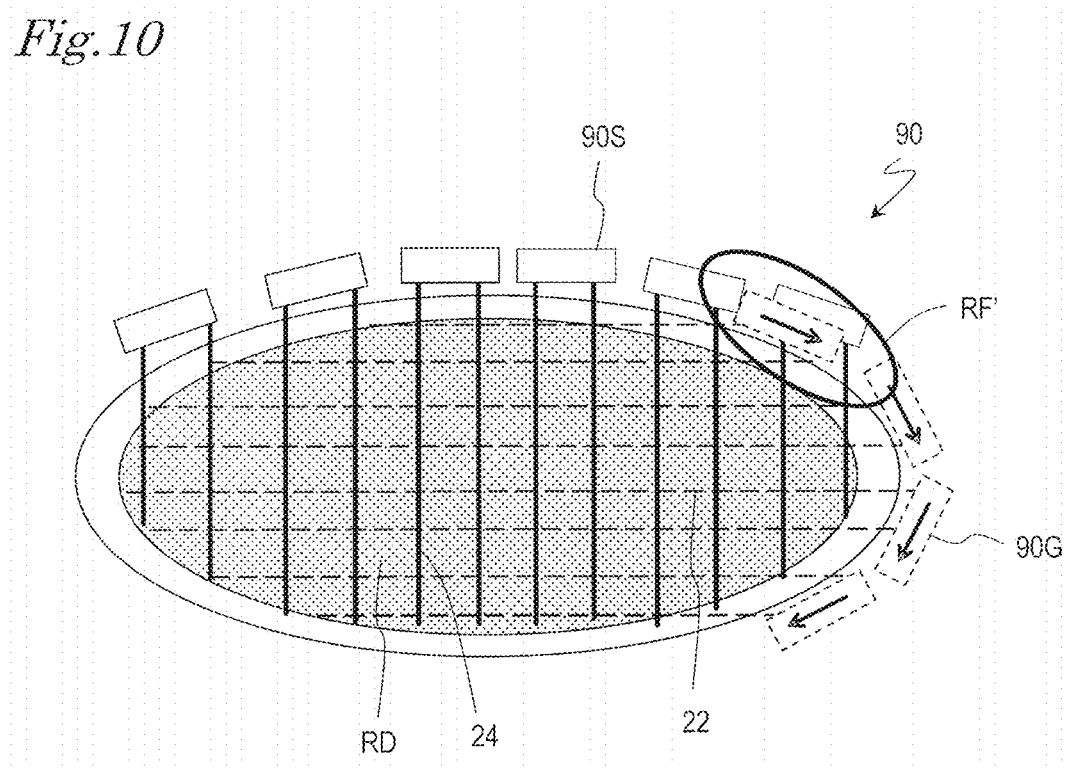
FIG. 10 A schematic plan view showing the circuit construction of a display panel of Comparative Example.

Now, with reference to FIG. 10, a display apparatus 90 of Comparative Example will be described. In the display apparatus 90 of Comparative Example, in the elliptical displaying region RD, a plurality of gate lines 22 are provided along the horizontal direction and a plurality of source lines 24 are provided along the vertical direction.

In the frame region RF outside the displaying region RD, gate drivers 90G and source drivers 90S are disposed. The gate lines 22 and the source lines 24 are respectively connected to the gate drivers 90G and the source drivers 90S. In this construction, in the frame region RF, the gate drivers 90G are disposed on the extensions of the gate lines 22, and the source drivers 90S are disposed on the extensions of the source lines 24. Such an implementation where the respective drivers are provided on the extensions of the gate lines 22 and the source lines 24 has been commonly adopted in display panels having a rectangular displaying region.

However, in the case where the displaying region RD has an elliptical shape, the mounting regions of the gate drivers and the source drivers may overlap in a frame region RF' in an oblique direction. For example, a source driver 90S connected to the source lines 24 at the right end may be disposed in an obliquely upper-right frame region RF', whereas a gate driver 90G connected to the gate lines 22 at the upper end may also be disposed in the obliquely upper-right frame region RF'. This requires a broad region for accommodating the drivers 90G and 90S as the aforementioned obliquely upper-right frame region RF', which serves to hinder a narrow frame construction.

FIG. 1 is referred to again. In contrast to the aforementioned display apparatus 90 of Comparative Example, the display apparatus 100 of the present embodiment is such that the gate drivers 20G are disposed below the elliptical displaying region RD and the source drivers 20S are disposed above the displaying region RD. In this construction, the region in which the source drivers 20S are provided and the region in which the gate drivers 20G are provided are opposite from each other, with the displaying region RD being interposed therebetween.

In the displaying region RD of the display panel 10, a plurality of gate lines 22 extending along the horizontal direction and a plurality of source lines 24 extending along the vertical direction are arranged in a lattice shape.

Each of the plurality of source lines 24 is connected, via a connection line 24c, to one of the source drivers 20S disposed above (i.e. so as to be on an extension of a source line 24) the displaying region RD. Note that e.g. 100 to 1000 source lines 24 may be connected to one source driver 20S. The source lines 24 and the source drivers 20S may be connected in a similar manner as in the display apparatus 90 of Comparative Example.

On the other hand, each of the gate lines 22 is connected to a gate driver 20G via a gate connection line 26 and a connection line 26c extending along the vertical direction. Note that e.g. 100 to 1000 gate lines 22 may be connected to one gate driver 20G, typically via as many gate connection lines 26 as there are gate lines 22.

The gate connection lines 26 are wiring lines provided in the displaying region RD, and extend in parallel to the source lines 24 (i.e., in an orthogonal direction to the gate lines 22) while being electrically insulated from the source lines 24. In this construction, the gate drivers 20G are not located on the extensions of the gate lines 22.

The gate connection lines 26 are in the frame region RF connected to the gate drivers 20G via the connection lines 26c, and in the displaying region RD connected to gate lines 22. Thus, by connecting the gate lines 22 and the gate drivers 20G via the gate connection lines 26 disposed in the displaying region RD, it becomes possible to dispose the gate drivers 20G and the source drivers 20S in a relatively narrow frame region, without using complex routing of wiring lines in the frame region RF.

Interconnections 28 between the gate lines 22 and the gate connection lines 26 may be provided as appropriate in the displaying region RD, e.g. in a manner shown in the figure. In the example shown in the figure, the gate lines 22 which are at the upper end and the lower end of the displaying region RD are connected to two gate connection lines 26 that are the closest to the center of the right-left direction of the panel. This is because the gate lines 22 which are near the upper end and the lower end of the ellipse are shorter than the gate lines 22 which are near the center along the vertical direction of the displaying region RD, and therefore can only connect to the gate connection lines 26 within a certain region (i.e., a region near the center of the displaying region RD) along the horizontal direction. On the other hand, a gate line 22 at the central portion along the Y direction (i.e., the fourth one from the top in FIG. 1(a)) is connected to the gate connection line 26 that is connected to the gate driver 20G at the rightmost end, and the immediately underlying gate line 22 therefrom is connected to the gate connection line 26 that is connected to the leftmost gate driver 20G. Thus, an implementation where those gate lines which are closer to the upper end or the lower end of the vertical direction are connected to those gate connection lines 26 which are closer to the center along the horizontal direction lends itself for even a liquid crystal display panel whose displaying region RD is small (i.e., having fewer pixels).

The manner of connection between the gate lines 22 and the gate connection lines 26 is not limited to the above example. For example, a gate line 22 at the central portion along the Y direction (i.e., the fourth one from the top in FIG. 1(a)) may be connected to the gate connection line 26 that is connected to the gate driver 20G at the rightmost end, and the immediately underlying gate line 22 therefrom may be connected to the gate connection line 26 that is connected to a gate driver 20G at the central portion along the horizontal direction. Moreover, the gate lines 22 which are near the lower end may straightforwardly be routed through the frame region RF so as to be connected to the gate drivers directly (i.e., not via the gate connection lines 26, but only through the connection lines 26c).

Connection between the gate lines 22 and the gate connection lines 26 may be made in any manner. Although FIG. 1 illustrates an implementation where one gate connection line 26 is connected to one gate line 22 in the displaying region RD, this is not a limitation. Two interconnected gate connection lines 26 extending from the output of a gate driver 20G may be connected to one gate line 22. This will confer redundancy in the connection between the gate connection lines 26 and the gate lines 22, so that, even when one of the gate connection lines 26 breaks, for example, the other remaining gate connection line 26 may still provide connection between the gate driver 20G and the gate line 22.

Moreover, the aforementioned two gate connection lines 26 that are connected to the same gate line 22 may be provided at distant positions along the horizontal direction. In another implementation, the aforementioned two gate connection lines 26 may be connected to distinct gate drivers 20G, such that these gate drivers 20G synchronize to output similar gate signals.

In the display apparatus 100 shown in FIG. 1, the scanning direction of the gate drivers 20G is set in the direction of arrows shown in the figure, i.e., in the direction from left to right. In this construction, a plurality of pixels can be sequentially scanned from top to bottom for each gate line 22. When an ON voltage is applied to a gate line 22, the TFTs in the plurality of pixels (pixel row) which are connected to that gate line 22 become ON, so that source signals are supplied to the respective pixels in the pixel row via the source lines 24. Outputting of source signals from the source drivers 20S to the source lines 24 is made all at a time.

Hereinafter, a more specific exemplary circuit construction of the liquid crystal panel 10 in the displaying region RD will be described.

Figure 2:
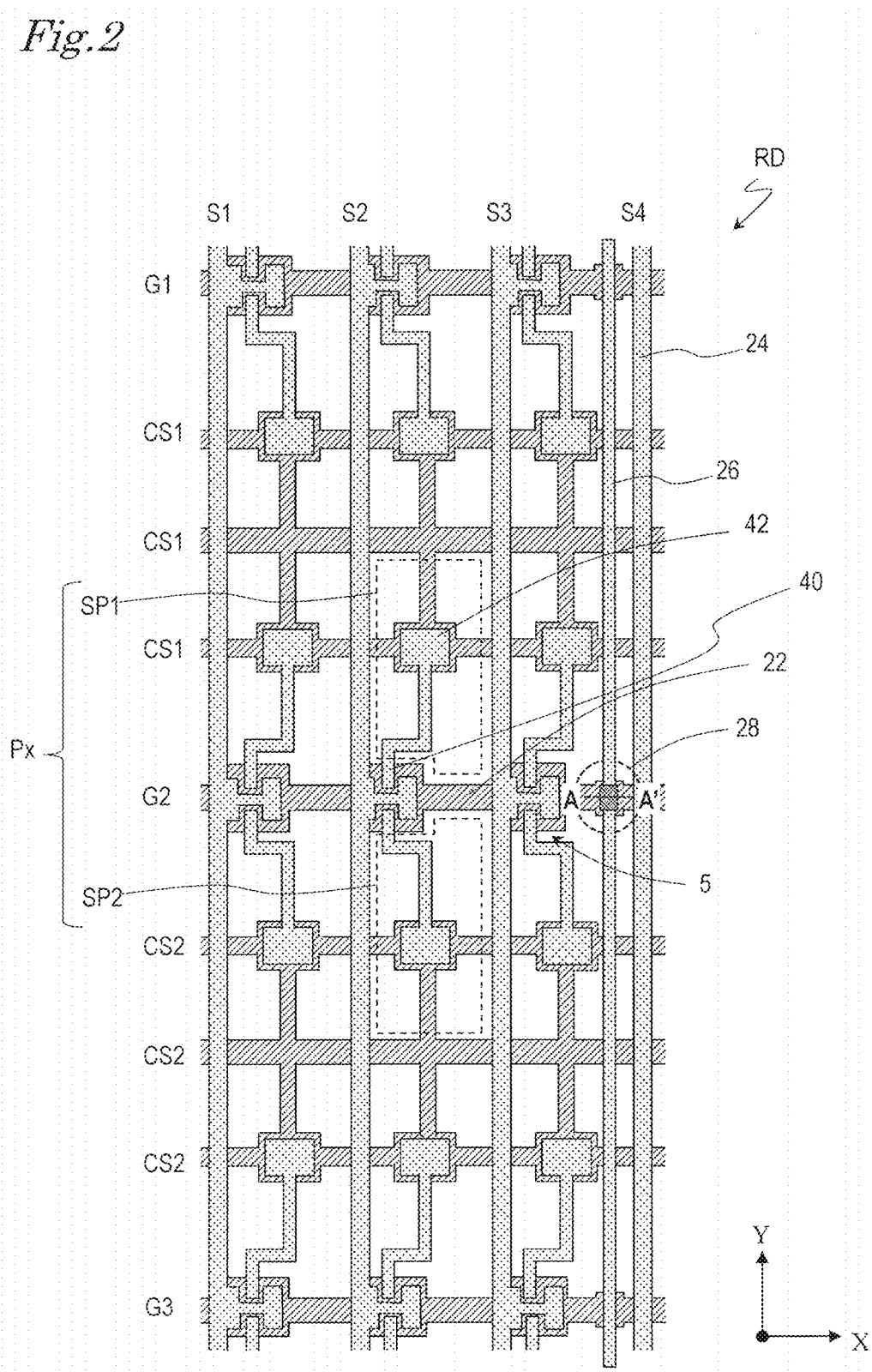
FIG. 2 A plan view showing a specific exemplary circuit construction within a displaying region of the display panel according to Embodiment 1.

FIG. 2 is a plan view showing a specific construction of the TFT substrate 12 within the displaying region RD. FIGS. 3(a) and (b) are cross-sectional views taken along line A-A' in FIG. 2. FIGS. 3(a) and (b) show specific manners of connection at interconnections 28 between the gate lines 22 and the gate connection lines 26 (FIGS. 3(a) and (b) showing respectively different implementations).

As shown in FIG. 2, the TFTs 5 are provided near the intersections between the gate lines 22 (G1 to G3) and the source lines 24 (S1 to S4). In the construction shown in FIG. 2, two subpixel regions SP1 and SP2, serving as subpixels, are provided along the vertical direction (the Y direction) with a TFT 5 interposed therebetween. Subpixel electrodes which are provided in the two subpixel regions SP1 and SP2 are connected to the common TFT 5. More specifically, distinct drain electrodes 40 extend from the common TFT 5 to the central portions of the two subpixel regions SP1 and SP2, so as to be connected to the subpixel electrodes of the respective subpixel regions SP1 and SP2 at drain widened portions 42 provided at their ends. Thus, in the present embodiment, for each common TFT 5, one pixel Px is constituted by two subpixel regions SP1 and SP2 to which the same source signal is to be supplied. Such a structure in which one pixel is constituted by two or more subpixel regions may be referred to as a multipixel structure.

Note that each of the two subpixel regions SP1 and SP2 may be adapted to be driven by the MVA (Multi-domain Vertical Alignment) method, for example. For this purpose, in each subpixel region SP1, SP2, a subpixel electrode having a slit or the like, or a projection or the like for alignment regulation may be provided so that four liquid crystal domains will be created around the drain widened portion 42, for example. Without being limited thereto, the method for creating the four liquid crystal domains may be a method that utilizes a photo-alignment technique, e.g., UV2A (UltraViolet induced multi-domain Vertical Alignment), or PSA (Polymer-Sustained Alignment), under which a minute amount of photopolymerizable monomer is added to a liquid crystal material and the photopolymerizable monomer is polymerized to thereby regulate the alignment direction of liquid crystal molecules.

In the implementation shown in FIG. 2, storage capacitor lines CS1 and CS2 extend in parallel to the direction that the gate lines 22 extend (the X direction). The storage capacitor line CS1 is provided in the same layer as the gate lines 22, and as viewed from the substrate normal direction, a portion thereof overlaps the drain widened portion 42 via a gate insulating layer 32 (see FIG. 3(a)). The drain widened portion 42 and the portion of the storage capacitor line CS1, overlapping each other via the gate insulating layer 32, constitute a storage capacitor. In the present embodiment, three storage capacitor lines CS1 extending along the horizontal direction are provided between adjacent gate lines G1 and G2, these storage capacitor lines CS1 being connected to one another. Moreover, three storage capacitor lines CS2 extending along the horizontal direction between further adjacent gate lines G2 and G3, these storage capacitor lines CS2 being connected to one another.

Thus, the mutually-separate storage capacitor lines CS1 and CS2 are provided for the two subpixel regions SP1 and SP2 between which each TFT 5 is interposed, such that different voltages are applied to the storage capacitor lines CS1 and CS2. As a result, even when the same source signal is supplied to the two subpixel regions SP1 and SP2, different liquid crystal alignment states (luminances) can be achieved in the respective subpixel regions, whereby viewing angle characteristics can be improved. In particular, a multipixel structure can improve the viewing angle dependence of y characteristics of a liquid crystal display apparatus of a vertical alignment mode.

However, the above pixel construction is only exemplary; a display apparatus according to an embodiment of the present invention may take any other implementation. The display apparatus may have any arbitrary circuit construction in accordance with the operation mode or the like. For example, in a liquid crystal display apparatus of a lateral electric field mode, a multipixel structure does not need to be adopted, and electrically independent storage capacitor lines as aforementioned do not need to be provided.

In the present embodiment, the gate connection lines 26 are provided so as to extend in parallel to the source lines 24. In the figures, three adjacent pixels Px along the horizontal direction correspond respectively to an R pixel, a G pixel, and a B pixel. Each gate connection line 26 is disposed in a pixel column corresponding to one of the three pixels of R, G and B.

Hereinafter, with reference to FIGS. 3(a) and (b), an implementation of the interconnection 28 between a gate line 22 and a gate connection line 26 will be described. Prior to describing the interconnection 28 in detail, the fundamental construction of the TFT substrate 12 as an active matrix substrate will be described first.

The TFT substrate 12 in the present embodiment has a construction in which a gate layer including the gate lines 22 is provided on the glass substrate 30. The gate layer may include the gate electrodes of the TFTs 5, the storage capacitor lines CS1 and CS2 shown in FIG. 2, and so on. The gate layer is formed through patterning by using a single-layer film or multilayer film of Ti, Mo, Al, Ta, Cr, Au, Cu, etc., for example.

Moreover, the gate lines 22 are covered by the gate insulating layer 32. The gate insulating layer 32 is formed as a single-layer film or multilayer film of an $SiN_x$ film and an $SiO_2$ film, for example.

Although not shown in the figure, a semiconductor layer to be used as an active layer of the TFTs 5 is provided on the gate insulating layer 32. The semiconductor layer may be provided in e.g. island shapes so as to overlap the gate electrodes (the widened portions of the gate lines 22 shown in FIG. 2) via the gate insulating layer 32. The semiconductor layer may be made of an amorphous silicon, a polysilicon, or an oxide semiconductor (e.g. an In—Ga—Zn—O-based oxide semiconductor or an In—Sn—Zn—O-based oxide semiconductor).

On the semiconductor layer, an SD layer (source/drain layer) including the source lines 24 and the drain electrodes 40 is provided. The SD layer is formed through patterning by using a single-layer film or multilayer film of Ti, Mo, Al, Ta, Cr, Au, Cu, etc., for example. The SD layer includes source electrodes which are connected to the source lines 24 and situated, via a gap, opposite to the drain electrodes 40 projecting toward the TFTs 5. In the implementation shown in FIG. 2, each source electrode has an H shape so as to accommodate the projecting portions of two drain electrodes 40. The source electrodes and the drain electrodes 40 are both connected to semiconductor layers (not shown) which are disposed so as to overlap the gate electrodes.

The SD layer includes the gate connection lines 26. In a step of forming the SD layer in which the aforementioned metal film is patterned, the gate connection lines 26 can be easily formed by using a known photolithography technique or the like. The gate connection lines 26 are formed so as to be in parallel to the source lines 24 and yet electrically insulated from the source lines 24.

Moreover, as shown in FIGS. 3(a) and (b), the SD layer (source lines 24, gate connection lines 26, etc.) is covered by the interlayer dielectric layer 34. The interlayer dielectric layer 34 may include an inorganic dielectric layer (passivation layer) which is made of $SiO_2$, $SiN_x$, or the like covering the TFTs 5 and an organic dielectric layer (planarization layer) which is made of a photosensitive resin material or the like.

Furthermore, a transparent electrically conductive layer which is made of ITO (indium tin oxide) or IZO (indium zinc oxide) or the like may be provided on the interlayer dielectric layer 34. The transparent electrically conductive layer would typically include subpixel electrodes. However, in other embodiments of display apparatuses, the aforementioned transparent electrically conductive layer may be a layer including CS transparent electrodes which are provided so as to define storage capacitors below the subpixel electrodes. In a liquid crystal display apparatus of a lateral electric field mode, the aforementioned transparent electrically conductive layer may be a layer including a transparent common electrode which is provided opposite to the subpixel electrodes. In a reflection-type liquid crystal display apparatus, instead of the aforementioned transparent electrically conductive layer, an opaque electrically conductive layer (reflection electrode layer) including reflection electrodes of Al or the like.

The transparent electrically conductive layer (or reflection electrode layer) which is provided on the interlayer dielectric layer 34 includes the connection electrodes 23 as illustrated in FIG. 3(a). In the implementation of the interconnection 28 shown in FIG. 3(a), the connection electrodes 23 included in this transparent electrically conductive layer allow the gate lines 22 and the gate connection lines 26 to be connected.

Now, the step of forming the interconnection 28 shown in FIG. 3(a) will be described. First, in a step of fabricating the TFTs 5, at each interconnection 28, the gate line 22, the gate insulating layer 32, the source line 24, and the gate connection line 26 are provided upon the glass substrate 30. Moreover, the interlayer dielectric layer 34 is provided so as to cover the TFT 5.

Thereafter, in each subpixel region, a contact hole that reaches the drain widened portion 42 (see FIG. 2) is made in the interlayer dielectric layer 34 covering the TFT 5. This contact hole is formed by, for example, after patterning the organic dielectric layer included in the interlayer dielectric layer 34 by a photolithography technique, utilizing this organic dielectric layer as a mask, and etching the underlying inorganic dielectric layer so that the contact hole will reach the drain widened portion 42 (SD layer).

In this step, as shown in FIG. 3(a), at the interconnection 28, an opening is made so as to expose at least a portion of the gate connection line 26 (SD layer). Furthermore, at the interconnection 28, etching is allowed to progress until the gate insulating layer 32 is also etched, whereby the gate lines 22 can be exposed in the opening.

Thereafter, in a step of forming a transparent electrically conductive layer for providing subpixel electrodes or the like, each transparent connection electrode 23 is provided so as to be in contact with both the gate connection line 26 and the gate line 22 in the aforementioned opening. As a result, the gate connection line 26 and the gate line 22 can be electrically connected via the transparent connection electrode 23. The transparent connection electrode 23 may be provided so as to cover at least a portion of the gate line 22 and at least a portion of the gate connection line 26 in the opening.

In the frame region RF, similarly to the above, monolithic gate drivers can be fabricated by utilizing the process of forming the TFTs 5, the process of making contact holes in the interlayer dielectric film, and the process of providing the transparent electrically conductive layer.

As described above, the interconnection 28 shown in FIG. 3(a) above can be formed by utilizing a conventional process of forming pixels, without increasing the number of masks or adding any separate processes.

FIG. 3(b) shows another implementation of the interconnection 28. In the implementation shown in FIG. 3(b), at the interconnection 28, an opening reaching the gate line 22 is made in the gate insulating layer 32, and thereafter in a step of forming the SD layer, a gate connection line 26 is provided so as to be in contact with the gate line 22 via the opening, together with the source line 24 and the like. In this manner, contact between the gate line 22 and the gate connection line 26 can be achieved in a smaller region.

As has been described above, with the display apparatus of the present embodiment, the gate drivers 20G and the gate lines 22 are connected by using the gate connection lines 26 being disposed in the displaying region RD, which makes it easy to dispose the gate drivers 20G and the source drivers 20S at different and remote places in the frame region RF. Thus, a narrow frame region can also be realized in a display panel having a displaying region RD of a non-rectangular shape.

As is illustrated in FIG. 2, each portion in which the interconnection 28 of a gate line 22 is formed has an increased width. Moreover, any portion at which a gate line 22 that does not form an interconnection 28 intersects a gate connection line 26 similarly has an increased width. Such construction decreases the cycle of the repetition pattern, thus promoting the efficiency of the pattern check and providing for increased producibility.

Embodiment 2

In each liquid crystal display apparatus according to Embodiment 2, too, connection between the gate lines 22 and the gate drivers 20G is achieved by using gate connection lines 26 which are disposed in the displaying region RD, similarly to Embodiment 1. Like components to those in Embodiment 1 will be denoted by like reference numerals, and any detailed description thereof may be omitted.

Figure 4:
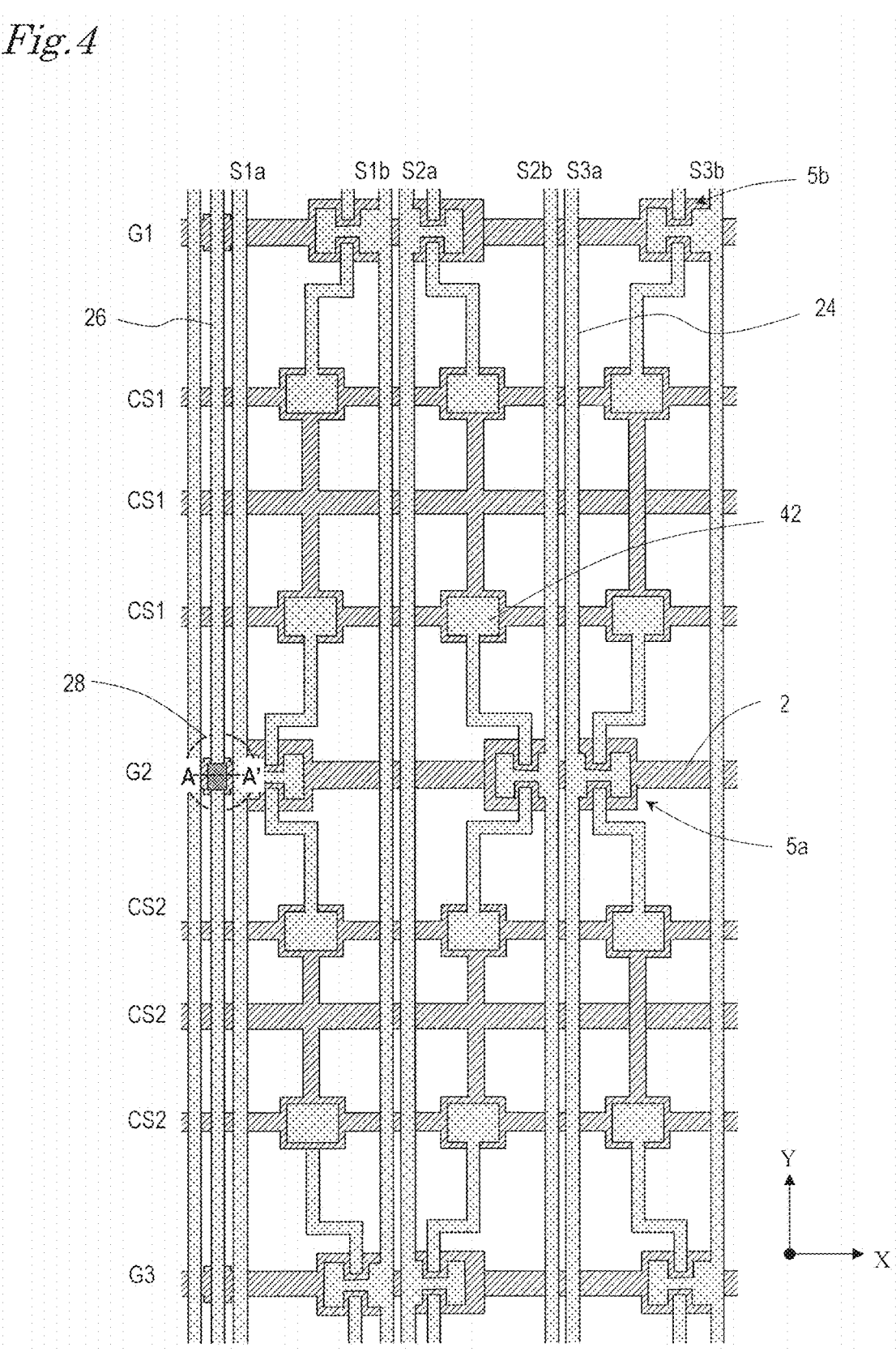
FIG. 4 A plan view showing an exemplary circuit construction for a display panel according to Embodiment 2.

FIG. 4 is a plan view showing a circuit construction within the displaying region of a display apparatus according to Embodiment 2. In the implementation shown in FIG. 4, pairs of source lines 24 (S1a, S1b), (S2a, S2b), and (S3a, S3b) are provided, which are disposed so that respective pixel columns extending along the vertical direction are interposed therebetween.

In each pixel column, one of two adjacent pixels along the vertical direction has a TFT 5a which is connected to the left source line, whereas the other has a TFT 5b which is connected to the right source line. Stated otherwise, in each pixel column extending along the vertical direction, pixels connected to the left source line and pixels connected to the right source line are alternately provided, such that the TFTs 5a and 5b are disposed in a zigzag manner. Such structure may be referred to as a "double-source, TFT zigzag arrangement structure (or TFT staggered arrangement structure)". Moreover, regarding adjacent pixel columns, the pixels connected to the left source line and the pixels connected to the right source line are in reverse arrangement. For example, assume a pixel column (referred to as "S1 pixel column") that is connected to the source lines S1a and S1b and a pixel column ("S2 pixel column") that is connected to the source lines S2a and S2b. Connected to the gate line G1 are a TFT 5b in the S1 pixel column and a TFT 5a in the S2 pixel column; connected to the gate line G2 are a TFT 5a in the S1 pixel column and a TFT 5b in the S2 pixel column. Thus, in the S1 pixel column, a TFT 5b, a TFT 5a, a TFT 5b, . . . are alternately connected in this order beginning from the gate line G1; in the S2 pixel column, a TFT 5a, a TFT 5b, a TFT 5a, . . . are alternately connected in this order beginning from the gate line G1. To the two source lines provided in each pixel column, e.g., the source lines S1a and S1b and the source lines S2a and S2b, signals of positive polarity are supplied to S1a and S2a, whereas signals of negative polarity are supplied to S1b and S2b, for example.

Thus, two source lines are provided for one pixel column; TFTs 5a and 5b are disposed in a zigzag manner; and signals to be supplied to these two source lines have opposite polarities. As a result, while the polarity of the signal to be supplied to each source line is maintained identical throughout one vertical scanning period, it is possible to realize driving methods such as dot inversion driving (i.e., a manner of driving where voltages to be applied to adjacent pixels along the up-down direction and the right-left direction have opposite polarities and pixel voltages in pixels in oblique directions share the same polarity).

Each gate connection line 26 is disposed in between two source lines 24 that are connected to different pixel columns, in parallel to the source lines 24. At each interconnection 28, the gate connection line 26 and the gate line 22 may be connected in the implementation shown in FIG. 3(a) or FIG. 3(b).

Figure 5:
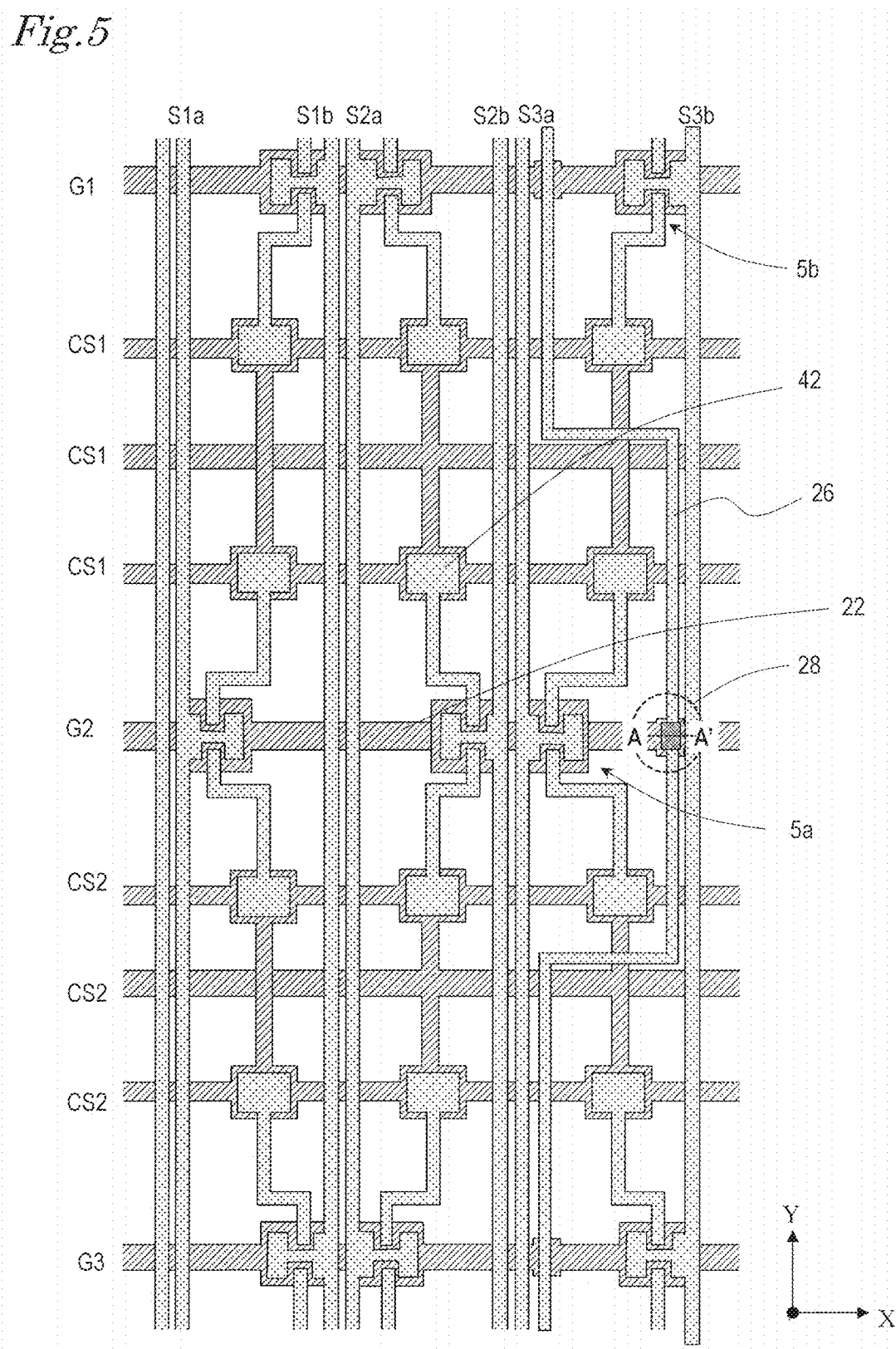
FIG. 5 A plan view showing another exemplary circuit construction for a display panel according to Embodiment 2.

FIG. 5 is a plan view showing a circuit construction within the displaying region of a display apparatus according to another implementation of Embodiment 2. Similarly to the implementation shown in FIG. 4, the implementation shown in FIG. 5 has a "double-source, TFT zigzag arrangement structure (TFT staggered arrangement structure)", thus being able to perform dot inversion driving.

In the implementation of FIG. 5, the gate connection line 26 in each pixel column extends in a crank shape, so as to include a straight portion which is near the opposite source line from the source line to which a TFT 5a or a TFT 5b is connected, this straight portion being parallel to the source line. For example, each gate connection line 26 extends in a crank shape which includes a straight portion near and parallel to the source line S3b in any pixel having a TFT 5a which is connected to the source line S3a, and a straight portion near and parallel to the source line S3a in any pixel having a TFT 5b which is connected to the source line S3b. Even though in a crank shape, the gate connection lines 26 as a whole extends in the same direction as the source lines; in the present specification, such a situation is also considered to have the gate connection lines 26 extend in the same direction as the source lines (the Y direction).

In the implementation of FIG. 5, too, the gate connection lines 26 are provided in the source layer. At each interconnection 28, the gate connection line 26 and the gate line 22 may be connected in the implementation shown in FIG. 3(a) or FIG. 3(b).

In a comparison between the implementation of FIG. 4 and the implementation of FIG. 5, the following advantages and disadvantages exist.

Unlike in the implementation of FIG. 5, each gate connection line 26 in the implementation of FIG. 4 does not overlap the pixel electrode (subpixel electrodes), and thus the parasitic capacitance created therebetween is small. This leads to an advantage in that any fluctuation in the pixel voltage (subpixel voltages) caused by the gate signal is small, and thus a broad design margin exists against display unevenness or other insufficiencies associated with gate signals.

On the other hand, in the implementation of FIG. 4, gaps need to be ensured between each gate connection line 26 and its two adjacent source lines 24, thus detracting from the pixel aperture ratio (panel transmittance). In the implementation of FIG. 5, the gate connection lines 26 are disposed so as to overlap the pixel electrodes (subpixel electrodes); therefore, although the pixel aperture ratio is decreased by the provision of the gate connection lines 26, absence of the need to provide gaps on both sides of each gate connection line 26 helps to reduce the decrease in the pixel aperture ratio as compared to the implementation of FIG. 4.

Figure 6:
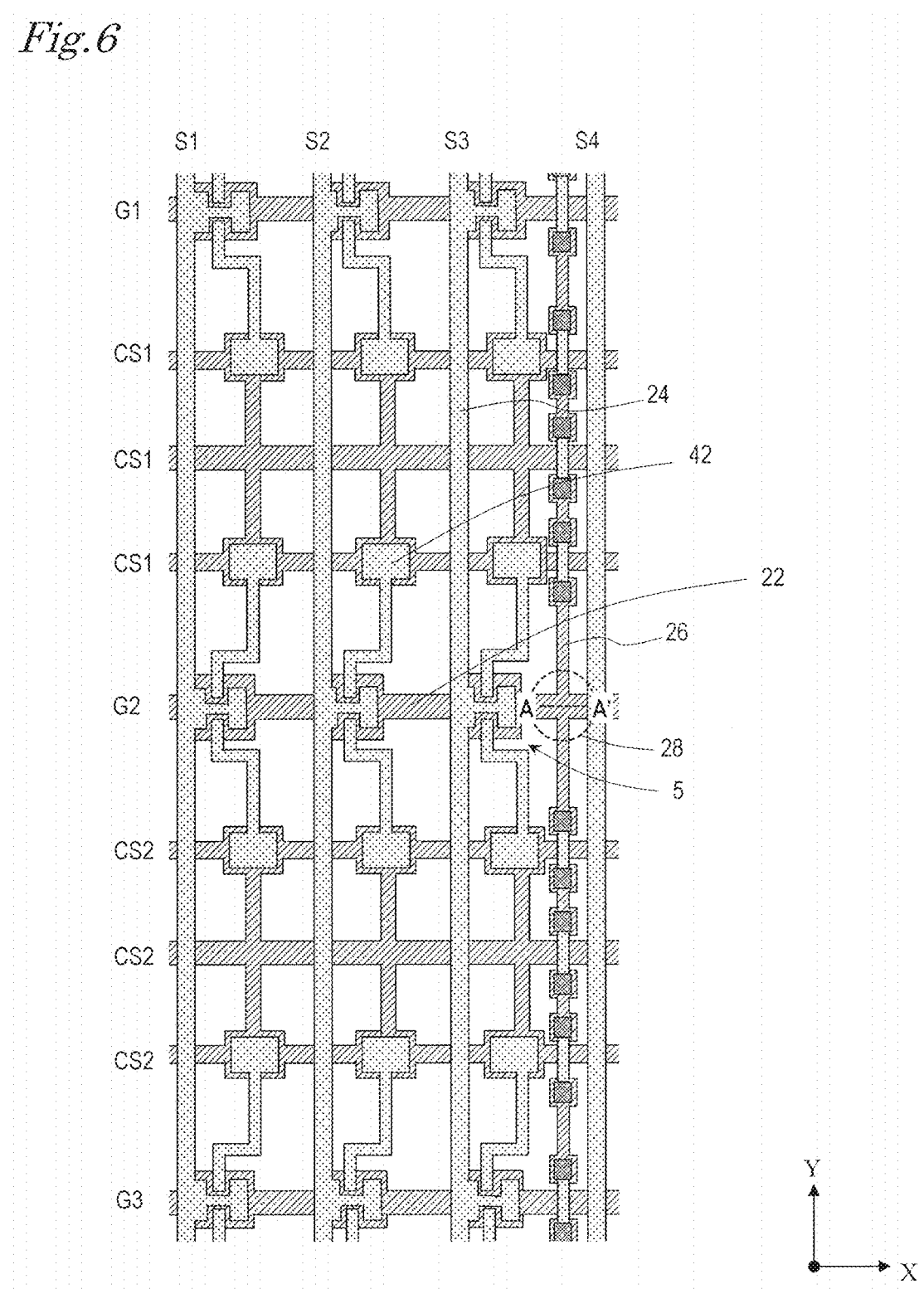
FIG. 6 A plan view showing still another exemplary circuit construction for a display panel according to Embodiment 2.

FIG. 6 is a plan view showing a circuit construction within the displaying region of a display apparatus according to still another implementation of Embodiment 2. In the implementation shown in FIG. 6, unlike in Embodiment 1 as shown in FIG. 2, the gate connection lines 26 are partly made in the gate layer. Each gate connection line 26 includes a plurality of straight portions which are provided in the same layer as the gate lines 22 and extend in parallel to the source lines 24 (i.e., in a direction which is orthogonal to the gate lines 22: the Y direction).

However, each gate connection line 26 needs to be electrically insulated from any gate line other than the gate line to be connected, and from the storage capacitor lines CS1 and CS2. For this reason, in the regions intersecting any other gate lines or the storage capacitor lines CS1 and CS2, the plurality of straight portions which are provided in the gate layer are connected via bridges which are provided in the SD layer. In order to form the bridges, openings are made in the gate insulating layer, above the straight portions that are included in the gate layer. Each bridge is formed so as to be in contact with the straight portion exposed in the opening (see FIG. 3(b)). In this construction, each gate connection line 26 is composed of a set of straight portions provided in the gate layer, which are connected via bridges in the SD layer.

Figure 7:
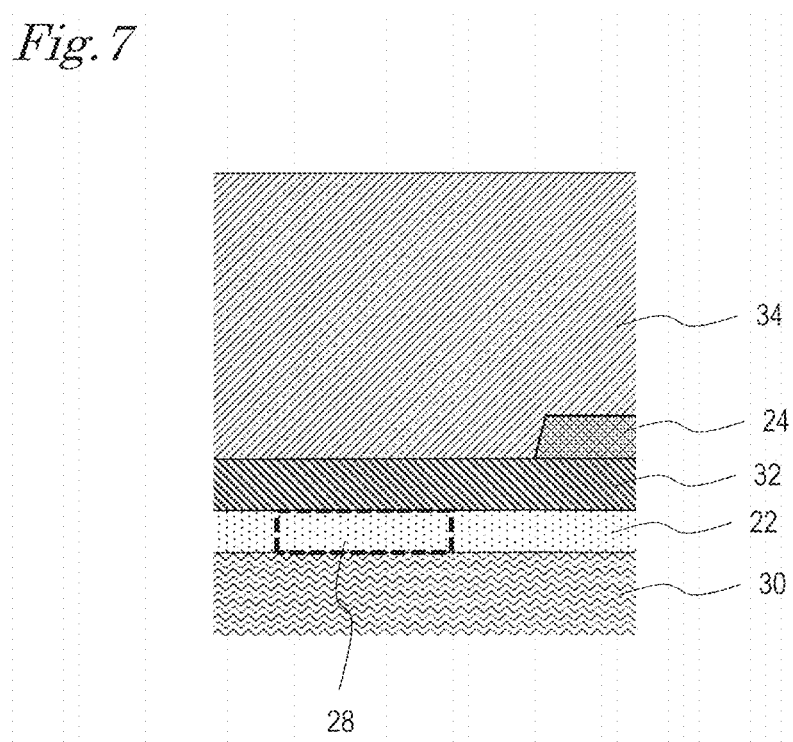
FIG. 7 A diagram showing a cross section taken along line A-A' in FIG. 6.

FIG. 7 is a cross-sectional view taken along line A-A' in FIG. 6. As shown in FIG. 7, in the interconnection of the present embodiment, a gate line 22 which is provided in the gate layer and a straight portion extending along a direction which is orthogonal thereto (i.e., a perpendicular direction to the plane of figure) are connected. This construction is obtained by, in the step of forming the gate layer on the glass substrate 30, patterning the metal film so that the aforementioned straight portion extends from the gate line.

Embodiment 3

In Embodiment 3, display apparatuses having a displaying region of special shapes which are not an ellipse as illustrated in FIG. 1 will be described.

FIG. 8(a) shows a display apparatus having a circular displaying region RD as a non-elliptical displaying region. FIG. 8(b) shows a display apparatus having a displaying region RD of a track-and-field track shape (i.e. a shape combining a rectangle with semicircles projecting from both its sides).

In the display apparatuses shown in FIGS. 8(a) and (b), too, in the frame region RF, the region in which the source drivers 20S are provided and the region in which the gate drivers 20G are provided are disposed opposite from each other, with the displaying region RD being interposed therebetween. Moreover, the gate drivers 20G and the gate lines 22 are connected via gate connection lines 26 which extend in the displaying region RD along a direction parallel to the source lines 24. The construction of the interconnection 28, etc., may be similar to Embodiment 1 or 2 as illustrated in FIGS. 2 through 7.

Thus, in a displaying region of not only an elliptical shape, but also a circular or track shape, providing gate drivers and source drivers respectively on the extensions of the gate lines and the source lines will cause overlaps in the mounting regions of the drivers, and therefore a construction in which the gate drivers 20G are disposed on the opposite side from the source drivers 20S by using the gate connection lines 26 is advantageous.

Figure 9:
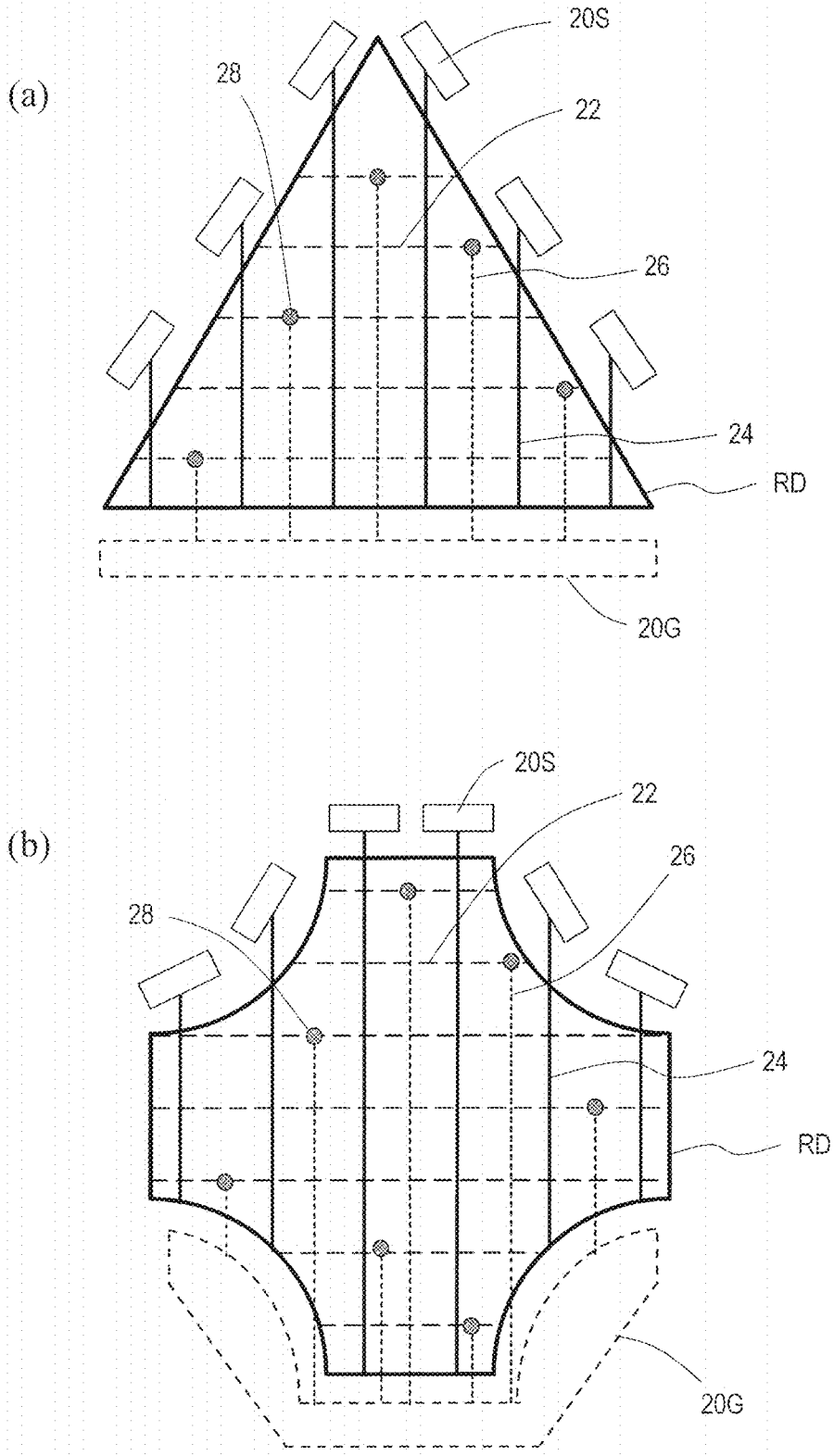
FIGS. 9 (a) and (b) are plan views circuit constructions of display panels according to other embodiments of the present invention.

FIGS. 9(a) and (b) respectively show a display apparatus having a triangular displaying region, and a display apparatus having a displaying region of a substantial cross shape having sector-shaped recesses in the four corners of a rectangle. In these displaying regions, too, the gate lines 22 are connected to the gate drivers 20G via gate connection lines 26 extending in the displaying region. This confers freedom to the arrangement of the source drivers 20S and the gate drivers 20G; by disposing them opposite from each other, with the displaying region RD being interposed therebetween, a narrow frame construction can be achieved while avoiding overlaps.

The manner of connection between the gate lines 22, the gate connection lines 26, and the gate drivers 20G may be various, as illustrated in FIG. 1(a), FIGS. 8(a) and (b), and FIGS. 9(a) and (b). Moreover, as shown in FIG. 1(a), connection lines 26c may be provided as necessary. Moreover, the scanning direction of the gate drivers 20G may be in one direction (from left to right) as shown in FIG. 1(a) or FIG. 8(a), or different scanning directions may be used for the plurality of gate drivers 20G as shown in FIG. 8(b). Driving of the gate drivers 20G and the source drivers 20S may be controlled by a control circuit not shown. As the control circuit, a known control circuit may be used, and the scanning direction and timing of the plurality of gate drivers 20G may be adjusted, for example. The control circuit and driving method to be used in each display apparatus would be clear to those skilled in the art, and the description thereof will be omitted.

As described above, in a display apparatus having a displaying region of a special shape, unlike in the case of a rectangular displaying region, the number of pixels in a pixel row extending along the horizontal direction (or in a pixel column extending along the vertical direction) will not be identical among all pixel rows (or among all pixel columns). In the case of a circular or elliptical displaying region, the pixel row near the upper end or near the lower end may have a number of pixels which is 50% or less of that of the largest pixel row. In the case where the pixel rows included in the displaying region vary relatively greatly in length, oblique edges will be formed in the displaying region; in this case, providing the respective drivers on the extensions of the gate lines and the source lines will result in overlaps. Therefore, especially in the case where pixel rows having a number of pixels which is 80% or less (or more suitably, 60% or less) of the number of pixels in the largest pixel row are included, the above embodiments of the present invention are suitable for realizing a narrow frame construction by avoiding overlaps between the mounting regions of drivers. The same is also true of the pixel columns.

Thus, display apparatuses according to embodiments of the present invention have been described; however, display apparatuses according to embodiments of the present invention are not limited to the illustrated ones, but may take various implementations. For example, a touch screen panel (touch sensor) may be provided in the display panel. The touch screen panel may be either an out-cell type or an in-cell type. Moreover, a light-transmitting cover corresponding to the displaying region of a special shape may be mounted; and in this light-transmitting cover, a lens portion (edge-cut portion or an edge-round portion) may be provided in an outer peripheral portion covering the frame region of the display panel. By thus providing a lens portion in the region corresponding to the frame region, the narrowed frame region can be made even less conspicuous. In addition, the construction of the above embodiment can be adopted for narrowing the frame region in various display apparatuses other than liquid crystal display apparatuses.

The TFTs in a liquid crystal display panel according to an embodiment of the present invention may be known TFTs, such as amorphous silicon TFTs (a-Si TFTs), polysilicon TFTs (p-Si TFTs), or microcrystalline silicon TFTs (μC-Si TFTs); however, it is preferable to use TFTs having an oxide semiconductor layer (oxide TFTs).

The oxide semiconductor contained in the oxide semiconductor layer may be an amorphous oxide semiconductor, or a crystalline oxide semiconductor having a crystalline portion. Examples of the crystalline oxide semiconductor include polycrystalline oxide semiconductors, microcrystalline oxide semiconductors, and crystalline oxide semiconductors whose c axis is aligned substantially perpendicular to the layer plane.

The oxide semiconductor layer may have a multilayer structure of two or more layers. In the case where the oxide semiconductor layer has a multilayer structure, the oxide semiconductor layer may include an amorphous oxide semiconductor layer and a crystalline oxide semiconductor layer. Alternatively, it may include a plurality of crystalline oxide semiconductor layers of different crystal structures. It may include a plurality of amorphous oxide semiconductor layers. In the case where the oxide semiconductor layer has a two-layer structure including an upper layer and a lower layer, an energy gap of the oxide semiconductor contained in the upper layer is preferably greater than an energy gap of the oxide semiconductor contained in the lower layer. However, in the case where the difference in energy gap between these layers is relatively small, the energy gap of the oxide semiconductor of the lower layer may be greater than the energy gap of the oxide semiconductor of the upper layer.

The material, structure, film formation method of the amorphous oxide semiconductor and each crystalline oxide semiconductor above, the construction of an oxide semiconductor layer having a multilayer structure, and the like are described in Japanese Laid-Open Patent Publication No. 2014-007399, for example. The entire disclosure of Japanese Laid-Open Patent Publication No. 2014-007399 is incorporated herein by reference.

The oxide semiconductor layer may include at least one metallic element among In, Ga, and Zn, for example. The oxide semiconductor layer may contain an In—Ga—Zn—O-based semiconductor (e.g., indium gallium zinc oxide), for example. Herein, an In—Ga—Zn—O-based semiconductor is a ternary oxide of In (indium), Ga (gallium), and Zn (zinc), where the ratio between In, Ga, and Zn (mole fractions) is not particularly limited; for example, In:Ga:Zn=2:2:1, In:Ga:Zn=1:1:1, In:Ga:Zn=1:1:2, and the like are included. Such an oxide semiconductor layer can be made of an oxide semiconductor film containing an In—Ga—Zn—O-based semiconductor. Note that a channel-etch type TFT having an active layer containing an oxide semiconductor, e.g., an In—Ga—Zn—O-based semiconductor, may be referred to as a "CE-OS-TFT".

The In—Ga—Zn—O-based semiconductor may be amorphous or crystalline. As a crystalline In—Ga—Zn—O-based semiconductor, those crystalline In—Ga—Zn—O-based semiconductors whose c axis is aligned substantially perpendicular to the layer plane are preferable.

Note that the crystal structures of crystalline In—Ga—Zn—O-based semiconductors are disclosed in e.g. Japanese Laid-Open Patent Publication No. 2014-007399, Japanese Laid-Open Patent Publication No. 2012-134475, Japanese Laid-Open Patent Publication No. 2014-209727, and so on. The entire disclosure of Japanese Laid-Open Patent Publication No. 2012-134475 and the entire disclosure of Japanese Laid-Open Patent Publication No. 2014-209727 are incorporated herein by reference. A TFT having an In—Ga—Zn—O-based semiconductor layer has a high mobility (20 times that of a-Si TFT or greater) and a low leak current (less than 1/100 of that of a-Si TFT), and therefore is suitably used as the driving TFTs (e.g., the TFTs included in driving circuits that are provided on the same substrate as the displaying region, around the displaying region in which a plurality of pixels are included) and as the pixel TFTs (i.e., the TFTs provided in the pixels).

Instead of an In—Ga—Zn—O-based semiconductor, the oxide semiconductor layer may contain another oxide semiconductor. For example, it may contain an In—Sn—Zn—O-based semiconductor (e.g. $In_2O_3$—$SnO_2$—ZnO; InSnZnO). An In—Sn—Zn—O-based semiconductor is a ternary oxide of In (indium), Sn (tin), and Zn (zinc). Alternatively, the oxide semiconductor layer may contain an In—Al—Zn—O-based semiconductor, an In—Al—Sn—Zn—O-based semiconductor, a Zn—O-based semiconductor, an In—Zn—O-based semiconductor, a Zn—Ti—O-based semiconductor, a Cd—Ge—O-based semiconductor, a Cd—Pb—O-based semiconductor, a CdO (cadmium oxide), an Mg—Zn—O-based semiconductor, an In—Ga—Sn—O-based semiconductor, an In—Ga—O-based semiconductor, a Zr—In—Zn—O-based semiconductor, an Hf—In—Zn—O-based semiconductor, an Al—Ga—Zn—O-based semiconductor, a Ga—Zn—O-based semiconductor, or the like.

INDUSTRIAL APPLICABILITY

Embodiments of the present invention are broadly applicable to various display apparatuses.

REFERENCE SIGNS LIST

5 TFT
10 display panel
12 TFT substrate
14 counter substrate
16 liquid crystal layer
18 sealing member
20S source drivers
20G gate drivers
22 gate line
23 transparent interconnection
24 source line
26 gate connection line
28 interconnection
30 glass substrate
32 gate insulating layer
34 interlayer dielectric layer
100 display apparatus

The invention claimed is:

1. A display apparatus including a displaying region including a plurality of pixels and a frame region provided outside the displaying region, the display apparatus comprising:
  a plurality of gate lines in the displaying region and extending along a first direction;
  a plurality of source lines in the displaying region and extending along a second direction which intersects the first direction;
  at least one gate driver in the frame region, the plurality of gate lines each being connected to the at least one gate driver;
  a plurality of source drivers in the frame region, the plurality of source lines each being connected to one of the plurality of source drivers;
  a plurality of gate connection lines provided in the displaying region extending along the second direction, the plurality of gate lines each being connected to the at least one gate driver via one of the plurality of gate connection lines;
  a gate driver mounting region in which the at least one gate driver is provided in the frame region; and
  a plurality of interconnections between the plurality of gate lines and the plurality of gate connection lines being provided in the displaying region, wherein
  the plurality of gate connection lines intersect the plurality of gate lines, respectively;
  each of the plurality of gate connection lines includes a plurality of straight portions provided in a gate layer including the plurality of gate lines; and
  plurality of straight portions are connected Via bridges in a source layer including the plurality of source lines.

2. The display apparatus according to claim 1, further comprising:
  a source driver mounting region in which the plurality of source drivers are successively provided such that only frame region portions are between adjacent source drivers in the frame region.

3. The display apparatus according to claim 1, wherein
  the at least one gate driver includes a plurality of gate drivers, and
  the plurality of gate drivers are disposed in a peripheral portion below the displaying region.

4. The display apparatus according to claim 1, wherein
  a scanning direction of the at least one gate driver is set in a direction from left to right or from right to left in the displaying region.

5. The display apparatus according to claim 1, wherein
  the plurality of source drivers are successively provided such that only frame region portions are between adjacent source drivers in the frame region,
  the at least one gate driver includes a plurality of gate drivers, the plurality of gate drivers being successively provided in the gate driver mounting region, and
  a direction along which the plurality of gate drivers are successively provided is parallel or substantially parallel to a direction along which the plurality of source drivers are successively provided.

6. The display apparatus according to claim 1, further comprising:
  a source driver mounting region in which the plurality of source drivers are successively provided such that only frame region portions are between adjacent source drivers in the frame region, wherein
  the source driver mounting region is in the frame region above the displaying region and the gate driver mounting region is in the frame region below the displaying region.

7. The display apparatus according to claim 1, wherein
  the at least one gate driver includes a plurality of gate drivers,
  the plurality of gate drivers are in the frame region, and
  the plurality of gate lines are each connected to one of the plurality of gate drivers.

8. A display apparatus including a displaying region including a plurality of pixels and a frame region provided outside the displaying region, the display apparatus comprising:
  a plurality of gate lines in the displaying region and extending along a first direction;
  a plurality of source lines in the displaying region and extending along a second direction which intersects the first direction;
  at least one gate driver in the frame region, the plurality of gate lines each being connected to the at least one gate driver;

a plurality of source drivers in the frame region, the plurality of source lines each being connected to one of the plurality of source drivers;

a plurality of gate connection lines provided in the displaying region extending along the second direction, the plurality of gate lines each being connected to the at least one gate driver via one of the plurality of gate connection lines;

a gate driver mounting region in which the at least one gate driver is provided in the frame region; and a plurality of interconnections between the plurality of gate lines and the plurality of gate connection lines being provided in the displaying region; wherein the plurality of gate connection lines intersect the plurality of gate lines, respectively;

each of the plurality of gate connection lines includes a plurality of straight portions provided in a source layer including the plurality of source lines; and the plurality of straight portions are connected via bridges in a gate layer including the plurality of gate lines.

9. The display apparatus according to claim 8, further comprising:

a source driver mounting region in which the plurality of source drivers are successively provided such that only frame region portions are between adjacent source drivers in the frame region.

10. The display apparatus according to claim 8, wherein the at least one gate driver includes a plurality of gate drivers, and the plurality of gate drivers are disposed in a peripheral portion below the displaying region.

11. The display apparatus according to claim 8, wherein a scanning direction of the at least one gate driver is set in a direction from left to right or from right to left in the displaying region.

12. The display apparatus according to claim 8, wherein the plurality of source drivers are successively provided such that only frame region portions are between adjacent source drivers in the frame region, the at least one gate driver includes a plurality of gate drivers, the plurality of gate drivers being successively provided in the gate driver mounting region, and a direction along which the plurality of gate drivers are successively provided is parallel or substantially parallel to a direction along which the plurality of source drivers are successively provided.

13. The display apparatus according to claim 8, further comprising:

a source driver mounting region in which the plurality of source drivers are successively provided such that only frame region portions are between adjacent source drivers in the frame region, wherein the source driver mounting region is in the frame region above the displaying region and the gate driver mounting region is in the frame region below the displaying region.

14. The display apparatus according to claim 8, wherein the at least one gate driver includes a plurality of gate drivers, the plurality of gate drivers are in the frame region, and the plurality of gate lines are each connected to one of the plurality of gate drivers.

15. A display apparatus including a displaying region including a plurality of pixels and a frame region provided outside the displaying region, the display apparatus comprising:

a plurality of gate lines in the displaying region and extending along a first direction;

a plurality of source lines in the displaying region and extending along a second direction which intersects the first direction;

at least one gate driver in the frame region, the plurality of gate lines each being connected to the at least one gate driver;

a plurality of source drivers in the frame region, the plurality of source lines each being connected to one of the plurality of source drivers;

a plurality of gate connection lines provided in the displaying region extending along the second direction, the plurality of gate lines each being connected to the at least one gate driver via one of the plurality of gate connection lines;

a gate driver mounting region in which the at least one gate driver is provided in the frame region; and a plurality of interconnections between the plurality of gate lines and the plurality of gate connection lines being provided in the displaying region, wherein the plurality of gate connection lines intersect the plurality of gate lines, respectively; and a scanning direction of the at least one gate driver is set in a direction from left to right or from right to left in the displaying region.

16. The display apparatus according to claim 15, wherein the plurality of gate connection lines are provided in a same layer as the plurality of source lines, or the plurality of gate connection lines include portions that are provided in a same layer as the plurality of gate lines.

17. The display apparatus according to claim 15, further comprising:

a source driver mounting region in which the plurality of source drivers are successively provided such that only frame region portions are between adjacent source drivers in the frame region.

18. The display apparatus according to claim 15, wherein the at least one gate driver includes a plurality of gate drivers, and the plurality of gate drivers are disposed in a peripheral portion below the displaying region.

19. The display apparatus according to claim 15, wherein the plurality of source drivers are successively provided such that only frame region portions are between adjacent source drivers in the frame region, the at least one gate driver includes a plurality of gate drivers, the plurality of gate drivers being successively provided in the gate driver mounting region, and a direction along which the plurality of gate drivers are successively provided is parallel or substantially parallel to a direction along which the plurality of source drivers are successively provided.

20. The display apparatus according to claim 15, further comprising:

a source driver mounting region in which the plurality of source drivers are successively provided such that only frame region portions are between adjacent source drivers in the frame region, wherein the source driver mounting region is in the frame region above the displaying region and the gate driver mounting region is in the frame region below the displaying region.

21. The display apparatus according to claim 15, wherein the at least one gate driver includes a plurality of gate drivers, the plurality of gate drivers are in the frame region, and
the plurality of gate lines are each connected to one of the
   plurality of gate drivers.

* * * * *